April 7, 1942.  T. J. ZELLER ET AL  2,278,578
THRUST WASHER STRUCTURE
Filed Aug. 7, 1940
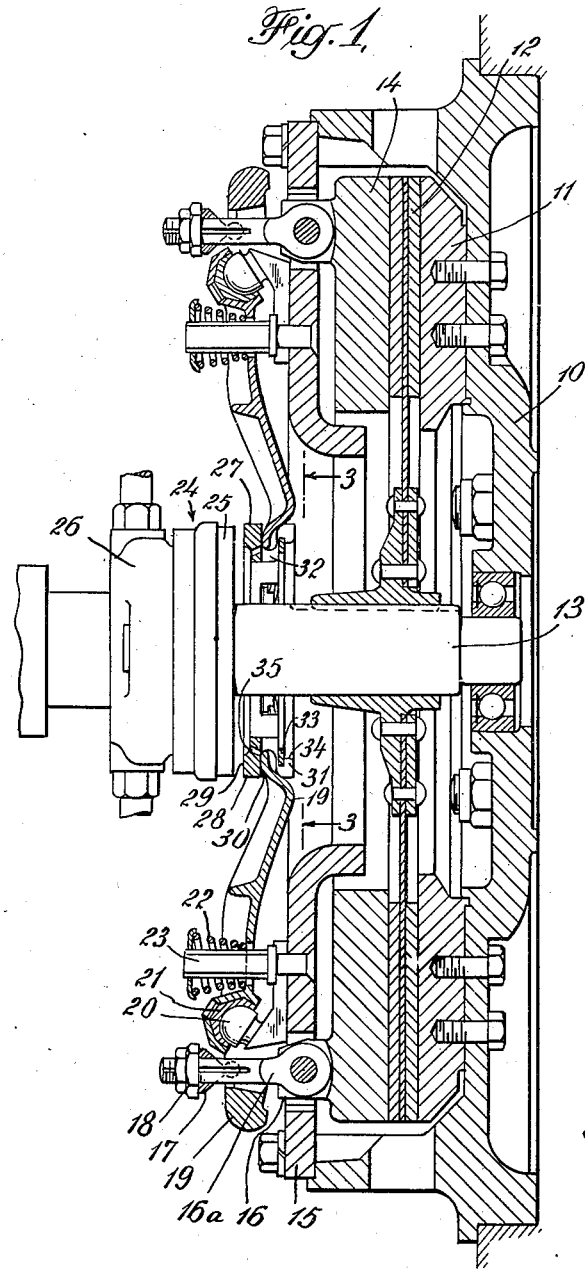
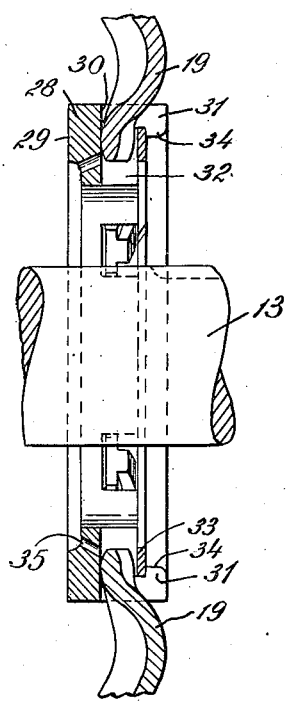
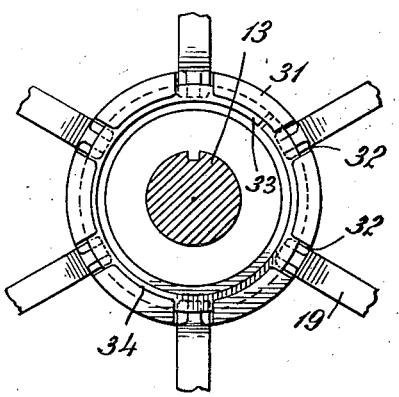
INVENTOR
THEODORE J. ZELLER
SIGMUND F. LISBON
BY
Hogue, Neary & Campbell
his ATTORNEYS Patented Apr. 7, 1942

2,278,578

UNITED STATES PATENT OFFICE 2,278,578

THRUST WASHER STRUCTURE

Theodore J. Zeller, Plainfield, and Sigmund F. Lisbon, North Plainfield, N. J., assignors to Mack Manufacturing Corporation, Long Island City, N. Y., a corporation of Delaware Application August 7, 1940, Serial No. 351,660

2 Claims. (Cl. 192—109)

This invention relates to clutches of the type including cooperating throwout bearings and throwout levers for disengaging the friction elements of the clutches, and relates more particularly to an improved thrust washer adapted to be interposed between the clutch throwout bearing and the clutch throwout levers to minimize wear thereof.

Clutches of the type generally described above usually include a plurality of cooperating friction elements which are normally urged together by means of springs and/or centrifugal force and are provided with a plurality of radially extending levers appropriately supported so that upon movement thereof in one direction, the friction surfaces are disengaged. Movement is imparted to the levers by means of a suitable throwout bearing usually of the anti-friction or lubricated type, one race or element of which engages the inner ends of the throwout levers.

In some forms of clutches, the inner ends of the levers are out of contact with all other parts of the clutch while the clutch is engaged and engage the throwout bearing only when the clutch is being disengaged.

In other types of clutches, the inner ends of the clutch throwout levers may be continually engaged by elements forming a part of the throwout bearings. With either type, considerable wear on the inner ends of the throwout levers and the cooperating portion of the throwout bearing occurs during disengagement of the clutch which causes the clutches to get out of adjustment.

An object of the invention is to provide an inexpensive thrust washer which minimizes the wear on the ends of the clutch levers and on the throwout bearing.

Another object of the invention is to provide an inexpensive and readily replaceable thrust washer which permits lubrication of the clutch throwout levers, thereby minimizing wear on such levers.

A further object of this invention is to provide a thrust washer which engages the ends of the clutch throwout levers, is self-centering and is supported in frictionless relation to the remainder of the clutch elements when the clutch is engaged.

Other objects of the invention will be apparent from the following description of a typical form of thrust washer embodying the present invention.

Thrust washers embodying the present invention consist of annular members or rings which are provided with a plurality of circumferentially spaced, axially extending flanges between which are received the inner ends of the clutch throwout levers. The radial disposition of the slots formed by the flanges prevents extended movement of the washer in a radial direction and thereby causes the washer to be disposed concentrically with the axis of rotation of the washer. Thus, the washer is self-centering and maintains a close engagement with the ends of the throwout levers.

More particularly, the washer consists of an annular member which is adapted to be interposed between the inner ends of the clutch throwout levers and the adjacent race or member of the clutch throwout bearing, so that the washer receives substantially all of the wear to which the clutch fingers would be subjected because of relative rotation between the throwout bearing and the throwout levers. The annular portion of the washer adjacent the throwout bearing is preferably provided with a relatively wide flat face which tends to distribute the wear on the throwout bearing over a wide area and thus uniformly distributes the wear on the bearing.

The washer is provided with a member for detachably retaining it on the ends of the clutch finger and out of contact with both the throwout bearing and the drive shaft of the clutch on which the bearing is supported while the clutch elements are engaged, thereby eliminating the need for antifriction or lubricated bearing elements between the washer and the shaft.

Provision is made for the lubrication of the ends of the clutch fingers through leakage of lubricant from the throwout bearing through passageways in the thrust washer.

For a better understanding of the present invention, reference may be had to the accompanying drawing in which:

Figure 1 is a view in cross-section of a typical form of clutch to which the thrust washer embodying the present invention is applied;

Figure 2 is an enlarged view in cross-section of a typical form of washer embodying the invention; and Figure 3 is a view in section taken on line 3—3 of Figure 1.

A thrust washer of a type embodying the invention is disclosed in Figure 1 as applied to the form of clutch disclosed in the Bruno Loeffler application Serial No. 244,529, filed December 8, 1938, now U. S. Patent No. 2,251,143, issued July 29, 1941.

This form of clutch consists generally of a flywheel and clutch casing 10 to which is connected a clutch element 11 which cooperates with a clutch disc 12 supported for axial movement, only, on a driven shaft 13. The clutch disc 12 is normally forced into engagement with the clutch element 11 by means of a pressure ring 14 which is mounted for relative axial movement on the clutch casing cover 15 by means of a plurality of lugs 16 and the eye bolts 16a supported thereon.

Suitable powerful springs (not shown) urge the pressure ring 14, the clutch disc 12 and the clutch element 11 into engagement for transmitting power from the motor to the driven shaft 13.

The eye bolts 16a are provided with fulcrum elements 17 which are adjustable along the eye bolt by means of suitable nuts 18. The fulcrum elements 17 engage the outer surfaces of the clutch throwout levers 19 which are rockably mounted upon hemispherical lugs 20 on the exterior of the cover 15. Suitable hemispherical sockets 21 on the throwout levers 19 permit free rocking movement of the throwout levers 19.

The throwout levers 19 are normally urged in a direction to withdraw the pressure ring 14 by means of coil springs 22 which engage the upper surface of the levers 19 and are supported upon studs 23 fixed to the clutch casing cover 15. These springs prevent rattling of the levers 19 and maintain them in tight engagement with the fulcrum elements 17.

The inner ends of the clutch levers 19 are moved to the right, as viewed in Figure 1, when the clutch is to be disengaged by means of a suitable throwout bearing either of the lubricated or an antifriction type which is supported for movement axially on the driven shaft 13. In the form of clutch illustrated, the throwout bearing 24 preferably is of the lubricated type, including an inner race (not shown), an outer race 25 engageable with the inner ends of the throwout levers 19, and a reservoir 26 for supplying lubricant to the bearing.

The thrust washer 27 embodying the present invention consists generally of an annular or ring portion 28 having opposite flat surfaces 29 and 30 which are adapted to engage respectively the outer race 25 of the throwout bearing and the inner ends of the clutch throwout levers 19. The ring 28 distributes the wear caused by slippage of the washer and the outer race of the bearing during acceleration of the outer race 25 to the speed of rotation of the clutch uniformly over the contacting face of the outer race 25 and thus causes it to wear evenly and much more slowly than if the ends of the levers 19 engaged the race directly.

Around the periphery of the annular or ring member 28 are a plurality of circumferentially spaced, axially extending flanges 31 of generally arcuate shape which define radially extending slots 32 between their adjacent ends. The slots 32 are of sufficient width to receive closely the inner ends of the throwout levers 19. Inasmuch as the throwout levers 19 are radially directed and fit closely within the slots 32, they tend to limit the movement of the washer 27 in all radial directions. The washer, however, is free to move slightly relatively to these fingers so that centrifugal force normally causes the ring to center itself coaxially with the driven shaft 13 during the rotation of the clutch.

The internal diameter of the washer 27 preferably is such that it is entirely out of engagement with the driven shaft 13 as best shown in Figure 3, and thus rattling of the washer 27 on the shaft 13 and frictional engagement of the washer with the shaft are entirely eliminated.

The washer 28 may be detachably connected to the inner ends of the throwout levers 19 in any suitable way, but it is preferred to use a simple and inexpensive construction such as the snap ring 33, best shown in Figures 2 and 3. The snap ring 33 is an annular spring member having a transverse slit therein which permits it to be compressed in order to insert it between the ends of the levers 19 and the radially inwardly projecting flanges 34 at the outer ends of the flanges 31. The clearance between the snap ring 33 and the ends of the throwout levers 19 is such that no interference with the adjustment of the levers with respect to the pressure ring 14 occurs.

When the washer 27 and the race 25 of the throwout bearing 24 are properly spaced and the slots 32 are of proper depth, the washer 27 cannot become detached from the levers even if the snap ring 33 should be broken or fall out of the washer 27. The only result would be a slight rattling of the washer as it rocks relatively to the levers and the throwout bearing.

Proper lubrication of the inner ends of the levers 19 is obtained by means of a plurality of openings or passageways 35 extending transversely through the ring 28 and communicating with the bottoms of the slots 32. Lubricant leaking from the throwout bearing 24 passes through openings 35 to the levers 19.

From the foregoing description of a typical form of washer embodying the invention, it will be apparent that a very simple and effective washer has been provided for minimizing the wear on the ends of the throwout fingers and bearing, both of which are expensive elements to replace and difficult to adjust upon replacement. Inasmuch as such thrust washers are of simple construction and may be readily detached from the throwout levers by merely removing the snap ring 33, it will be apparent that replacement of the washer is a comparatively simple matter and is far less expensive than the replacement of either the throwout levers or the throwout bearing.

It will be understood that the washer is susceptible to some variation, such as for example the thickness, weight and general shape of the elements thereof, and accordingly the form of washer described above should be considered as illustrative and not as limiting the scope of the following claims.

I claim:

1. In a clutch having cooperating friction elements normally urged into engagement, shafts supporting said friction elements, a plurality of radially extending throwout levers, a throwout bearing mounted about one of said shafts and an annular thrust washer connecting the inner ends of said levers for actuation by said bearing; said thrust washer being characterized in that it is provided with a plurality of recesses into which the inner ends of said levers are pivotally received, said washer being adapted to be engaged on one side thereof by said throwout bearing, and said washer having passageways extending from said one side to said recesses for passage of lubricant from the throwout bearing to the engaging surfaces of the inner ends of said throwout levers.

2. In a clutch having cooperating friction elements normally urged into engagement, shafts supporting said friction elements, a plurality of radially extending throwout levers, a throwout bearing mounted about one of said shafts and a thrust washer connecting the inner ends of said levers for actuation by said bearing; said thrust washer being characterized in that it comprises an annular member having spaced apart flanges extending axially therefrom and defining therewith a plurality of slots to pivotally receive the inner ends of said throwout levers, the inner diameter of said member being sufficiently large to allow said levers to center the member about said one shaft in position to be engaged only by said throwout bearing on the side thereof opposite from said flanges, and said member being provided with passages from the side adapted to be engaged by said bearing to the inner sides of said slots for passage of lubricant from the bearing to the ends of said levers.

THEODORE J. ZELLER.
SIGMUND F. LISBON.